Sept. 22, 1970  H. A. RAUSING  3,530,208
METHOD OF MOLDING A LINED HOLLOW BODY UTILIZING FOAMABLE
POLYSTYRENE PARTICLES AND AN INFLATABLE INNER MOLD
Filed Feb. 5, 1968

United States Patent Office 3,530,208
Patented Sept. 22, 1970

3,530,208
METHOD OF MOLDING A LINED HOLLOW BODY UTILIZING FOAMABLE POLYSTYRENE PARTICLES AND AN INFLATABLE INNER MOLD
Hans Anders Rausing, Lund, Sweden, assignor to AB Tetra Pak, Lund, Sweden, a Swedish company
Filed Feb. 5, 1968, Ser. No. 703,031
Claims priority, application Sweden, Feb. 15, 1967, 2,079/67
Int. Cl. B29d 27/08
U.S. Cl. 264—45  1 Claim

ABSTRACT OF THE DISCLOSURE

A method is provided for forming hollow bodies from partially pre-foamed particles of polystyrene plastic material. A suitable expandible inner mould component covered with a polystyrene plastic liner is provided so that bodies having openings smaller than the main cavity of the body can be formed with a liner of polystyrene plastic material secured to the inner wall of the hollow body.

---

Figure 1A:
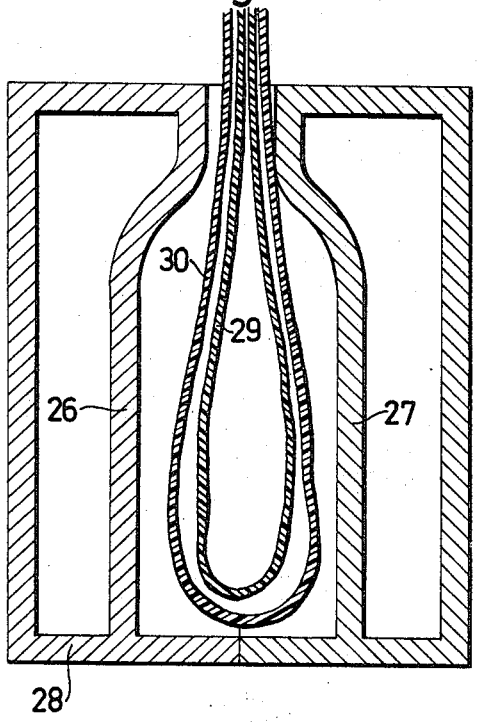

This invention is concerned with a method of producing a foam plastic hollow body, preferably a packaging container of the kind which has a container opening of an opening area that is less than the largest inner cross sectional area of the hollow body.

For packaging and other purposes of a similar nature, a great many can, bottle or beaker-shaped packages are used. Their design and general properties must naturally be adapted to the intended contents, and the packaging material must in each case be chosen so that its watertightness, resistance to fats, mechanical strength etc. fulfil the requirements that are stipulated for the package in order that it should be capable of carrying out its duty.

Plastic materials have lately become dominant as packaging materials, and these plastic materials are often used in combinations which consist of a number of different plastic layers which often have different properties, and also in material combinations which in addition to plastic also contain fibrous materials such as paper or cardboard.

Plastic foam has also been used lately for packaging purposes besides homogeneous plastic materials. This type of plastic has so far mostly found application as a heat-insulating and shock-absorbing material, but drinking mugs have also been known to be made from foam plastic. The type of foam plastic that is primarily considered here is the stiff and stable type which may be represented by polystyrene foam which in the course of production can be given a smooth and at least liquid-tight surface.

This plastic is foamed by means of the pre-treated plastic material, which is in the form of a powder or granules, being heated, causing the easy-to-boil substances contained in the plastic material to boil, which means that the plastic that has softened as a result of the heat swells or expands to an appreciably increased volume. If this process of expansion takes place in a forming cavity, the expanding plastic material will fill that cavity and will be compressed into a continuous foam plastic body which after cooling will largely retain its appearance.

A number of different methods, some of which are described in Swedish Pat. No. 159,838, can be used to condition the plastic material in such a way that it can be caused to expand when heated. It can quite generally be said that the plastic material, which in the present instance is assumed to be polystyrene (other plastic materials that may be considered are e.g. polymethacrylic ester), is treated with a solution, which is however not a solvent for the plastic in question, that has a boiling point lower than the softening point of the plastic. When the plastic material that has been treated in this way is heated, the solvent is caused to boil, which results in the plastic material swelling.

It has been found of advantage to pre-foam the material in order to achieve the best results when moulding foamable plastic, viz. to subject the plastic material that has been treated in the manner described above to limited heat treatment, during which the expansion process is carried on to such a stage that the particle size of the plastic material becomes suitable and the final expansion in the mould will yield the desired result.

At the final expansion stage, the mould used is filled with the pre-foamed plastic material, after which both the mould and the plastic material are heated, e.g. by the application of steam. Expansion of the already pre-foamed material is then continued and is preferably not stopped before all the expansion agent has boiled off.

During expansion in the forming cavity, the particles of plastic are fused together, at the same time as owing to the expansion they completely fill the mould cavity, from which the body cast can after cooling be removed.

The time required for the expansion process naturally depends to a great extent on the material thickness of the intended foam plastic body, but in the case of thin-walled bodies of the beaker or packaging container type, the expansion or foaming period can be reduced to a few seconds.

The foam plastic material, as we know, has a very low density and the material costs of a packaging container of the kind considered will be very small, and the foam plastic layer in addition provides good thermal insulation and a stiff package which can easily be destroyed by burning.

It has up till now not been possible to produce in one piece from foam plastic hollow bodies of the kind which have a "constricted" opening, owing to the fact that it was not possible to solve the problem of the inner mould component or core which must be capable of removal from the cast object. It is clear that the absence of a solution to the "core problem" has contributed to the freedom of choice in the matter of the shape of foam-moulded hollow bodies being greatly restricted. The method and equipment in accordance with the invention however allow a freer choice of the shape of moulded foam plastic bodies, and the method is characterised by the plastic material, that is capable of expansion as a result of the application of heat, being in the form of granules or a powder introduced into a mould consisting of an outer and an inner mould component, which between them define a forming cavity having an appearance that coincides with the shape of the desired hollow body, the outer mould component being divisible and the inner mould component being arranged in such a way that its cross section can be varied between a value which coincides with the inner cross sectional area of the desired hollow body, and a value which is less than the cross sectional area of the opening of the said hollow body; and by the expansible material introduced into the said forming cavity being, after its introduction into the forming cavity, heated to such an extent that it is caused to expand and is fused together to form a continuous and self-supporting unit, the size and shape of which coincide with the size and shape of the said forming cavity, after which the foam plastic hollow body that has been formed is removed from the mould by the outer mould being divided and taken away, whilst the inner mould component is collapsed or is caused to contract to such an extent that the inner mould component can be taken out through the opening of the foam plastic hollow body that has been formed.

The invention will be described below by reference to the attached diagrammatic drawings, of which FIGS. 1*a*, *b* and *c* illustrate the procedure of foam-plastic moulding and also show the equipment for the carrying-out of the method.

FIG. 1 shows how it is possible in accordance with the invention to produce a bottle-shaped hollow body consisting of an outer layer of foam plastic and an inner layer of homogeneous plastic material.

The difficulty in connection with the production of bottle-shaped containers is naturally the fact that there arises the problem of how the inner mould component, which must be capable of removal from the container after the forming operation, is to be shaped. The outer mould can in the way shown in FIG. 1a be made in two halves 26 and 27 each of which constitute part of a forming device 28, which in the manner described earlier is fitted with ducts and cavities arranged behind the mould, through which heating and cooling agents can be introduced.

The inner mould component is in the example described here made in the shape of an expansible "bladder" 29 which in the collapsed state can be introduced into, and removed from, the closed outer mould 26, 27 and the foam plastic body that has been formed. The expansible "bladder" 29 is designed to act as the core in the outer mould 26, 27 and should be made from a material which is only slightly elastic, e.g. rubber fabric or similar, and it shall in its expanded state have a shape which coincides with the inner shape of the container. The expansion of "bladder" 29 may be effected by means of a gas or liquid under pressure which is introduced into the inside of the balloon-shaped "bladder" or mould 29, and the collapsing of the "bladder" 29 may be effected by means of a vacuum.

Figure 1B:
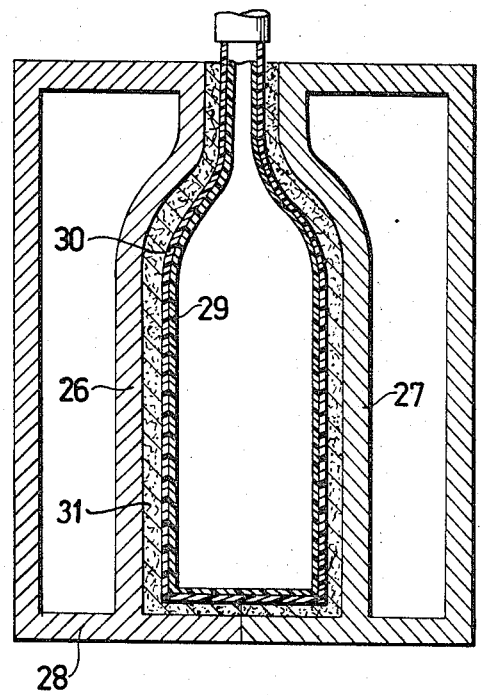
Figure 1C:
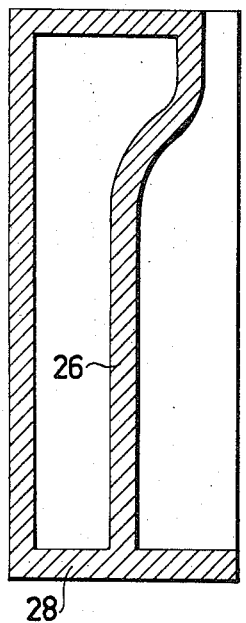
Figure 1C:
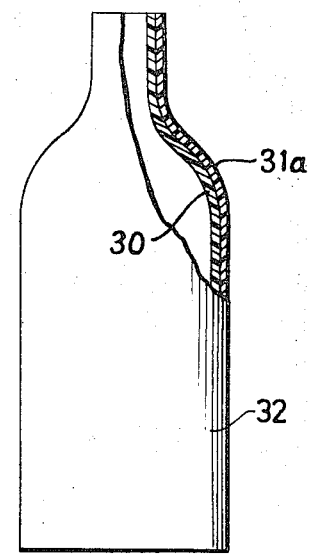

Before "bladder" 29 which forms the core is expanded, it may be inserted into a pre-produced elastic plastic lining 30, which together with "bladder" 29 is inserted into the closed outer mould 26, 27. When the expansible core 29 in the way shown in FIG. 1b is expanded by means of a pressurised agent being fed into its inside, it will enlarge so that lining 30 is also expanded. After the inner mould component thus formed has been established inside the outer mould component, it is centered, after which the partially pre-foamed plastic material prepared for final, complete foaming is introduced through the neck of the mould into the forming cavity 31 that has been formed between outer mold 26, 27 and the inner mould 29 and the lining 30 placed on this mould.

The plastic material is foamed in the same way as has been described earlier, and the inner mould component 29, after the foam plastic body that has been cast has cooled, is removed by means of the pressurised agent being evacuated which causes the mould 29 to collapse. The plastic lining 30 placed on the mould component 29 is however retained in the inside of the foam plastic body that has been cast. In order to ensure that lining 30 will adhere to the inside of the foam plastic body that has been cast, it is best if the plastic material is chosen in such a way that there will be a bond formed between the foam plastic and the lining when the layer of foam plastic is cast, but it is naturally also possible to provide the lining with small projections which during the casting of the foam plastic body will be fused into this, and in this way to lock the lining onto the foam plastic body.

The bladder or core component 29 is best made of moulded rubber fabric or similar. When a pressurised agent is supplied to such a core, the walls expand in such a way that the core forms a stiff and hard body whose walls are capable without changing their shape of withstanding the pressure which arises during the casting operation. The stiffness and well-defined shape of the core are further sufficient to enable the core to be guided and held in the correct position inside the mould during the casting process. When the core is to be removed from the completed hollow body, it is best if its inside is connected to a source of vacuum, as a result of which the core contracts so much that it can without difficulty be taken out of the hollow body. The completed hollow body 31a with line 30 is shown at 32 in FIG. 1c.

The example of carrying out the method shown here is only one example of the invention, and the shape of the container can naturally be varied within the framework of the idea behind the invention, and it is naturally not necessary to provide the container with an inner or outer "skin" of homogeneous plastic material. The core component can further be made of a material other than rubber fabric, and other materials that may be considered are e.g. nylon which may be reinforced by fabric.

What is claimed is:

1. A method for forming a foamed polystyrene plastic hollow body provided with an opening smaller than the largest cross sectional area of the cavity of the hollow body comprising placing a flexible polystyrene thermoplastic liner about an inner mould component, and placing the inner mould component within an outer mould component, the outer mould component having at least two separable sections to permit removal of the finished hollow body and the inner mould component being flexible, only slightly elastic, inflatable to form a stiff, hard body capable of withstanding pressure without changing shape and corresponding to the shape of the desired cavity in the hollow body and further comprising inflating said inner mould component to provide with the outer mould component a forming cavity, pouring partially pre-foamed particles of a polystyrene plastic material into the forming cavity, heating said mould to complete the foaming of said partially prefoamed polystyrene plastic material, to fuse said polystyrene plastic material to form the hollow body and to weld said polystyrene plastic liner to said foamed polystyrene plastic material to line said hollow body, collapsing the inner mould component, withdrawing the inner mould component from the hollow body and separating the sections of the outer mould component and removing the lined hollow body therefrom.

References Cited

UNITED STATES PATENTS

| 2,787,809 | 4/1957 | Stastny | 264—53 X |
| 2,949,658 | 8/1960 | Conn | 249—65 X |
| 2,981,984 | 5/1961 | Orr | 264—45 X |
| 3,135,640 | 6/1964 | Kepka | 264—45 X |
| 3,225,124 | 12/1965 | Wallace | 264—45 |
| 3,255,286 | 6/1966 | Lac-Belmont | 264—51 X |
| 2,929,109 | 3/1960 | Cresap | 264—321 X |
| 3,013,304 | 12/1961 | Richie | 264—53 X |
| 3,015,855 | 1/1962 | Merkel | 264—321 X |
| 3,032,823 | 5/1962 | Sherman | 264—314 X |
| 3,138,507 | 6/1964 | Wiltshire | 264—314 X |
| 3,225,127 | 12/1965 | Scott | 264—54 |
| 3,341,043 | 9/1967 | Santelli | 264—321 X |

JUILIUS FROME, Primary Examiner

P. A. LIEPOLD, Assistant Examiner

U.S. Cl. X.R.

18—5; 249—65, 83; 264—53, 314